(12) United States Patent
Drube et al.

(10) Patent No.: US 9,885,447 B2
(45) Date of Patent: Feb. 6, 2018

(54) METERING SYSTEM AND METHOD FOR CRYOGENIC LIQUIDS

(71) Applicant: CHART INC., Garfield Heights, OH (US)

(72) Inventors: Paul Drube, Burnsville, MN (US); Thomas Drube, Lakeville, MN (US)

(73) Assignee: Chart Inc., Garfield Heights, OH (US)

( * ) Notice: Subject to any disclaimer, the term of this patent is extended or adjusted under 35 U.S.C. 154(b) by 683 days.

(21) Appl. No.: 14/089,096

(22) Filed: Nov. 25, 2013

(65) Prior Publication Data

US 2014/0150469 A1    Jun. 5, 2014

Related U.S. Application Data

(60) Provisional application No. 61/731,287, filed on Nov. 29, 2012.

(51) Int. Cl.
| | |
|---|---|
| *F17C 13/00* | (2006.01) |
| *F17C 13/02* | (2006.01) |
| *G01F 1/00* | (2006.01) |

(52) U.S. Cl.
CPC ............. *F17C 13/025* (2013.01); *G01F 1/00* (2013.01)

(58) Field of Classification Search
CPC ..................................................... F17C 13/025
USPC ................................................. 62/49.1, 49.2
See application file for complete search history.

(56) References Cited

U.S. PATENT DOCUMENTS

| | | |
|---|---|---|
| 5,616,838 A | 4/1997 | Preston et al. |
| 5,787,940 A | 8/1998 | Bonn et al. |
| 6,505,470 B1 | 1/2003 | Drube et al. |
| 6,595,048 B1 | 7/2003 | Drube et al. |
| 2003/0033871 A1* | 2/2003 | Carroll .................. G01F 23/14 73/299 |
| 2003/0183017 A1 | 10/2003 | Drube et al. |
| 2004/0231411 A1 | 11/2004 | Drube et al. |

(Continued)

FOREIGN PATENT DOCUMENTS

| | | | |
|---|---|---|---|
| EP | 1184616 A2 * | 3/2002 | ............... F17C 9/00 |
| EP | 1 184 616 A2 | 6/2002 | |
| EP | 1 340 937 | 9/2003 | |

OTHER PUBLICATIONS

European Search Report from EP Application No. 13194502.4 dated Jan. 5, 2015.

*Primary Examiner* — Jianying Atkisson
*Assistant Examiner* — Antonio R Febles
(74) *Attorney, Agent, or Firm* — Cook Alex Ltd.; R. Blake Johnston

(57) ABSTRACT

A system for dispensing a cryogenic liquid includes a storage tank containing a supply of the cryogenic liquid and a metering chamber. A liquid inlet line is in communication with the storage tank and the metering chamber so that the metering chamber receives cryogenic liquid from the storage tank. A meter run is in communication with the metering chamber and includes a metering element, a dispensing line and a dispensing valve. A stabilizing column is positioned within the metering chamber and includes vertically spaced openings. Vertically spaced first and second pressure sensors are in communication with the interior of the stabilizing column. A controller is in communication with the metering element, the first and second pressure sensors and the dispensing valve.

28 Claims, 4 Drawing Sheets

(56) References Cited

U.S. PATENT DOCUMENTS

2006/0218941 A1* 10/2006 Drube ................. F17C 5/02
  62/50.2
2009/0114038 A1* 5/2009 Atkinson ............. G01F 1/44
  73/861.63

* cited by examiner

METERING SYSTEM AND METHOD FOR CRYOGENIC LIQUIDS

CLAIM OF PRIORITY

This application claims priority to U.S. Provisional Patent Application No. 61/731,287, filed Nov. 29, 2012, the contents of which are hereby incorporated by reference.

FIELD OF THE INVENTION

The present invention relates generally to dispensing systems for cryogenic fluids and, in particular, to a metering system and method for cryogenic liquids.

BACKGROUND

The use of liquid natural gas (LNG) as an alternative energy source for powering vehicles and the like is becoming more and more common as it is domestically available, environmentally safe and plentiful (as compared to oil). As a result, the need for dispensing systems and methods that accurately meter cryogenic liquids, such as LNG, has grown.

An example of an effective prior art cryogenic liquid metering system is provided in commonly assigned U.S. Pat. No. 5,616,838 to Preston et al., the contents of which are hereby incorporated by reference. The '838 patent discloses mounting a cryogenic liquid meter within an insulated cryogenic metering container so that the meter is submerged in cryogenic liquid that is provided from a storage tank and dispensed. This avoids two-phase flow through the meter and permits accurate metering without the need to initially circulate the cryogenic liquid through the meter to pre-cool the meter (prior to each dispensing session).

In addition, the '838 patent discloses that a volumetric flow rate of the cryogenic liquid being dispensed is read by the meter, and that this data is provided to a microprocessor. Temperature data from a temperature sensor positioned in the cryogenic metering container, or differential pressure data from a pair of vertically spaced pressure sensors positioned in the cryogenic metering container, is provided to the microprocessor so that the density of the cryogenic liquid being dispensed may also be determined. The microprocessor is then able to calculate and display the metered amount of cryogenic liquid/LNG dispensed to the use device.

While the system of the '838 patent performs well, the unknown composition of most LNG makes use of temperature to determine density (i.e. "temperature compensation") unacceptable. LNG is made up of mostly methane, but includes different levels of hydrocarbons, such as carbon dioxide and nitrogen.

With regard to use of pressure differential data to determine density, the dynamic nature of the cryogenic liquid as it flows into and out of the cryogenic metering container creates issues such as "noise" in the taps of the pressure sensors.

A need therefore exists for a metering system and method for cryogenic liquids that addresses at least some of the above issues.

DETAILED DESCRIPTION OF EMBODIMENTS

While the present invention will be described below in terms of a system and method for dispensing LNG, it is to be understood that they may be used to dispense alternative types of cryogenic liquids.

Figure 1:
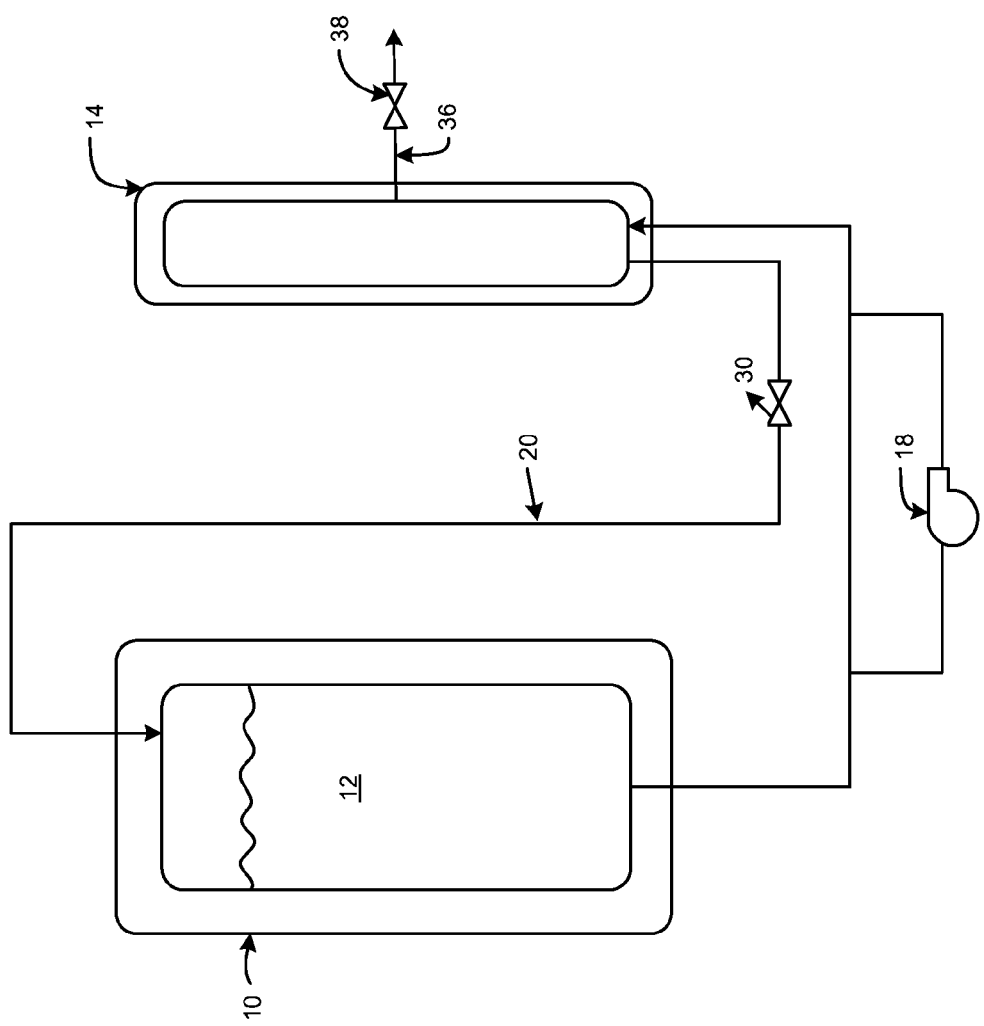
FIG. 1 is a schematic view of a storage tank and a cryogenic metering chamber and related piping and pump in an embodiment of the metering system and method for cryogenic liquids of the present invention.

In accordance with an embodiment of the system and method of the present invention, as illustrated in FIG. 1, an insulated storage tank 10 contains a supply of cryogenic liquid, such as LNG 12. As will be explained in greater detail below, the LNG is provided to an insulated cryogenic metering chamber 14 via liquid inlet line 16. It should be noted that the insulation may optionally be omitted for cryogenic metering chamber 14. The transfer of LNG from the storage tank 10 to the cryogenic metering chamber 14 may be accomplished by pressure differential, by a pump 18 or other cryogenic liquid transfer systems and methods known in the art. A recirculation line 20 also is connected between the storage tank and the cryogenic metering chamber, the use of which will also be explained below.

Figure 2:
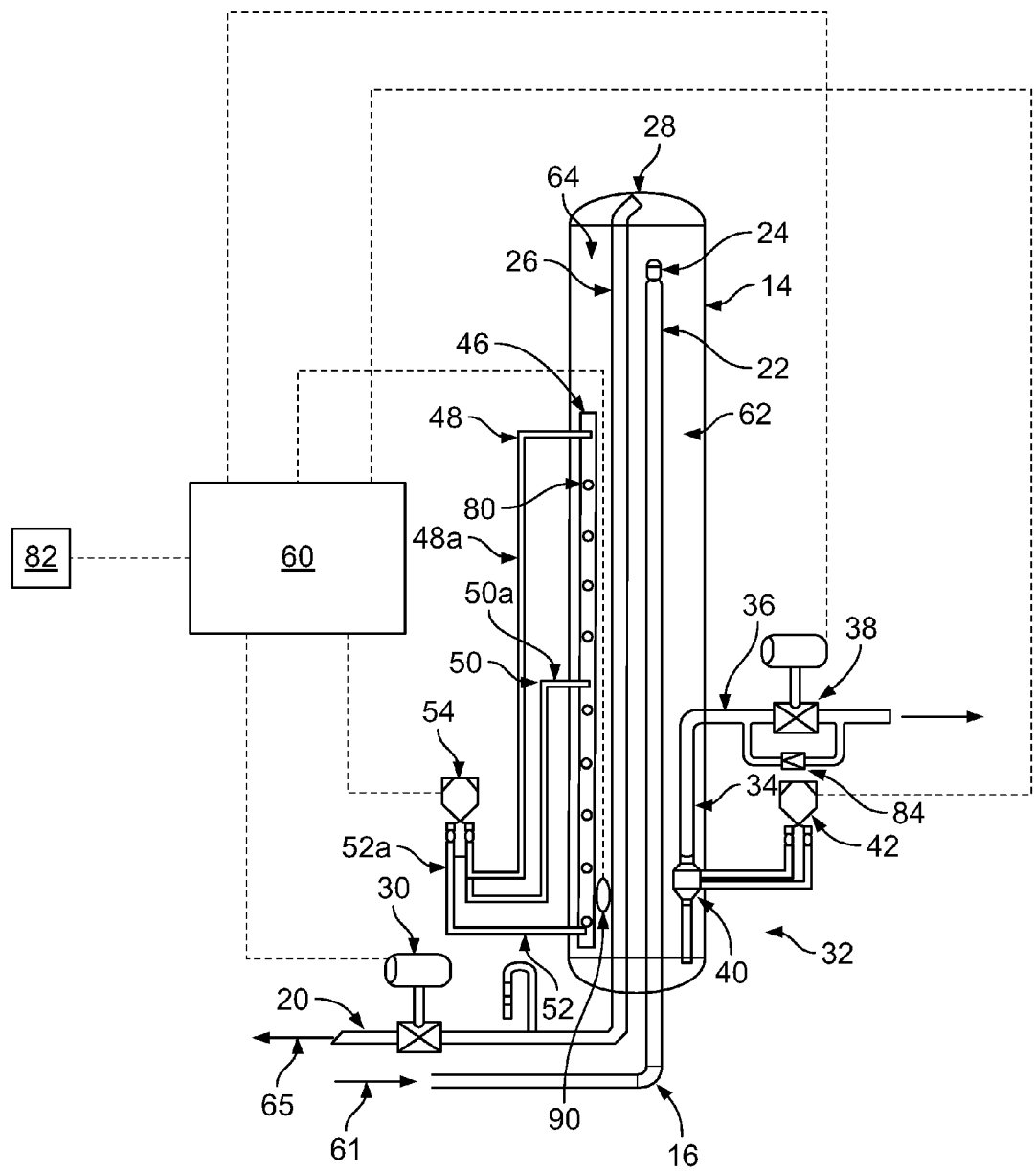
FIG. 2 is an enlarged schematic view of the cryogenic metering chamber of FIG. 1 and the related components.

With reference to FIG. 2, liquid inlet line 16 connects with a spray fill line 22 that is vertically positioned within cryogenic metering chamber 14. The spray fill line 22 features spray openings 24 in the top end. A recirculation column 26 features a recirculation inlet 28 and is connected to recirculation line 20, which is provided with recirculation valve 30. A meter run, indicated in general at 32, includes a meter line 34, having an inlet near the bottom of the cryogenic metering chamber. Meter line 34 is connected to dispensing line 36, which features a dispensing valve 38. A metering element 40 is positioned within the meter line, and communicates with a flow differential pressure transmitter 42.

In accordance with the illustrated embodiment of the invention, a stabilizing column 46 is positioned within the cryogenic metering chamber and features a low pressure sensor or tap 48, a middle pressure sensor or tap 50 and a high pressure sensor or tap 52. Each pressure tap communicates with the stabilizing column 46 and a stabilizing column differential pressure transmitter 54. It should be noted that only two of the pressure taps are required, the third tap is optional.

Flow differential pressure transmitter 42 and stabilizing column differential pressure transmitter 54 each communicate with a controller 60, such as a microprocessor, via wireless or wire connections. Recirculation valve 30 and dispensing valve 38 may be automated and also connected to microprocessor 60 for operation.

In operation, LNG is initially transferred from storage tank 10 (FIG. 1) to an empty cryogenic metering chamber 14 with the recirculation valve 30 open, the dispensing valve 38 closed and pump 18 on. As a result, LNG flows into the cryogenic metering chamber via liquid inlet line 16, as indicated by arrow 61 in FIG. 2, spray fill line 22 and spray openings 24. The LNG flowing through spray openings 24 collapses any pressure head in the cryogenic metering chamber 14. When the LNG in the cryogenic metering chamber, illustrated at 62, reaches the level of the recirculation inlet 28 of the recirculation column, the LNG flows through recirculation column 26 and line 20 and back to the storage tank, as indicated by arrow 65. After a period of time that is sufficient to ensure that the metering chamber is filled with LNG, the pump 18 is shut off (automatically or manually). As a result, the flow of LNG into the cryogenic metering chamber stops, and the metering element 40 is submerged in LNG. The recirculation valve 30 remains to its normal, open position.

When it is desired to dispense LNG, with reference to FIG. 2, a hose attached to the dispensing line 36 (see also FIG. 1) is connected to a vehicle or other use device, and the system is activated, such as by the user pushing a "Dispense" button in communication with the controller or microprocessor 60. When this occurs, pump 18 starts, while recirculation valve 30 remains open. LNG then flows into the cryogenic metering chamber through spray fill line 22 (and spray openings 24) and eventually rises to the level of recirculation inlet 28. The LNG then flows through recirculation column 26 and line 20 and back to the storage tank, as indicated by arrow 65. As a result, LNG flows through the recirculation valve 30 until discharge pressure, as measured by any or all of pressure taps 48, 50 and/or 52, and proper flowing conditions in the metering chamber 14 are achieved. This typically may take, as an example only, approximately fifteen seconds or less. Microprocessor 60 then opens dispensing valve 38 so that dispensing of LNG to the use device through the meter run 32 commences.

Figure 3:
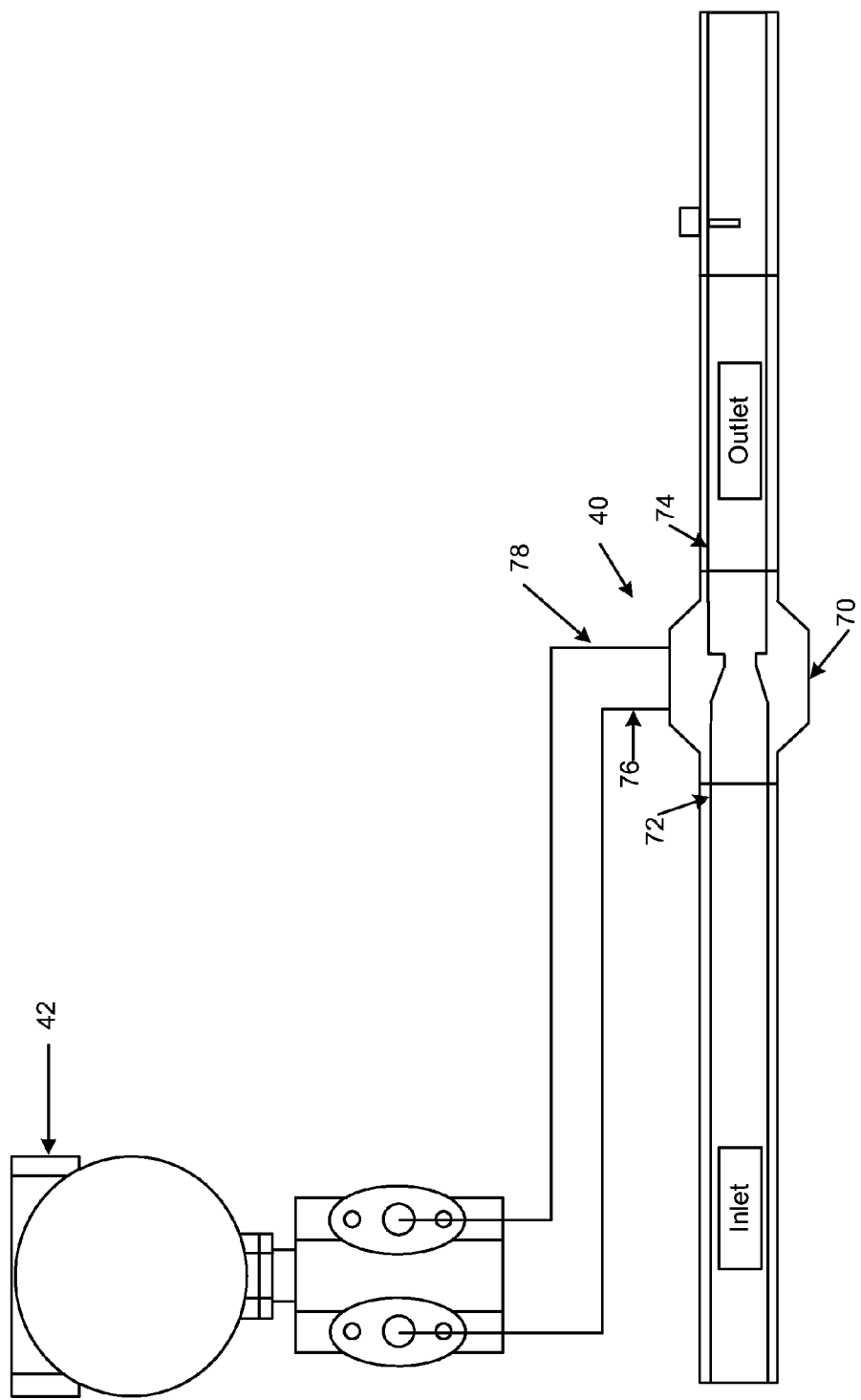
FIG. 3 is an enlarged schematic view of the metering element of FIG. 2.

With reference to FIG. 3, metering element 40 uses the Bernoulli principle that relates flow to pressure drop across an orifice and features a flow restriction or orifice 70 having an inlet side 72 and an outlet side 74. An inlet pressure sensor or tap 76 communicates with the inlet side 72 and an outlet pressure sensor or tap 78 communicates with the outlet side 74. As a result, a differential pressure is transmitted to the microprocessor 60 by the differential pressure transmitter 42, and the microprocessor determines the volumetric flow rate and mass flow rate through the metering element using the following equations:

$$\dot{m} = C \times A_2 \times \sqrt{2 \times DP_M \times \rho_{liq}} \quad \text{Equation (1)}$$

$$Q = C \times A_2 \times \sqrt{\frac{2 \times DP_M}{\rho_{liq}}} \quad \text{Equation (2)}$$

Where:
Q=volumetric flow rate [m^3/s]
m=mass flow rate [kg/s]
C=orifice flow coefficient
$A_2$=cross-sectional area of the orifice [m^2]
$DP_M$=Meter Diff. press. across orifice [kg/(m×s$^2$)]
$\rho_{liq}$=fluid density [kg/m$^3$]

As will be explained in greater detail below, $\rho_{liq}$ is determined using the differential pressure transmitter 54

Figure 4:
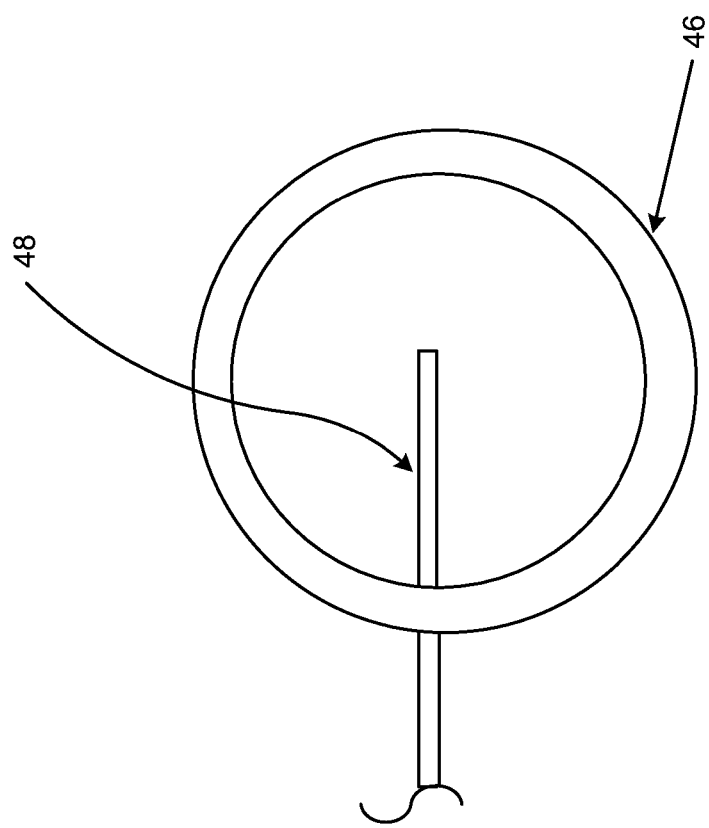
FIG. 4 is a top plan view of the stabilizing column of FIG. 2.

With reference to FIG. 2, stabilizing column 46 features a continuous sidewall that defines an interior of the stabilizing column. The sidewall has a number of openings 80 that are spaced along its vertical length. The top and bottom of the stabilizing column may be open. This permits LNG 62 from the cryogenic metering chamber to travel into the interior of the stabilizing column and maintain the same temperature as the LNG in the cryogenic metering chamber. As an example only, the stabilizing column may be a one inch (1") diameter, thin wall tube with holes spaced two inches apart (from the edges). Preferably, the stabilizing column is made of steel, or another metal material, and is mounted within one-eighths of an inch (⅛") from the interior surface of the cryogenic metering chamber side wall, with the holes facing towards the interior surface. As illustrated in FIG. 4 for low pressure tap 48, each pressure tap (48, 50 and 52) preferably extends into or near the longitudinal axis or horizontal center of the interior of the stabilizing column 46.

In addition, as illustrated in FIG. 2, low pressure tap 48 features an associated sensing line 48a running to differential pressure transmitter 54, middle pressure tap 50 features an associated sensing line 50a running to the differential pressure transmitter, and high pressure tap 52 features an associated sensing line 52a running to the differential pressure transmitter. The sensing lines 48a, 50a and 52a preferably feature equal inner diameters and lengths with each inner diameter being uniform through the length of the sensing line. This aids in minimizing surging in the sensing lines during pressure swings in the metering chamber.

The stabilizing column 46 takes out "noise" at the pressure taps that otherwise would be caused by LNG flow within the cryogenic metering chamber. In addition, the positioning of the pressure taps near the center of the stabilizing column minimizes the effects of bubbles that form during temperature swings on each pressure tap opening. The holes 80 of the stabilizing column also minimize the effects of pressure drop during flow.

The low pressure tap 48 and high pressure tap 52 are used to measure a differential or column pressure, which is sent to the microprocessor via stabilizing column differential pressure transmitter 54. As a result, the microprocessor 60 may calculate the density of the LNG in the cryogenic metering chamber using the following equation:

$$\rho_{liq}=[(DP_{Ctrans})/(g_c \times H_C)]\rho_{gas} \quad \text{Equation (3)}$$

Where:
$\rho_{liq}$=fluid density [kg/m$^3$]
$DP_{Ctrans}$=Measured Differential Pressure across Column [kg/(m×s)$^2$]
$g_c$=gravitational acceleration=9.80665 m/s$^2$
$H_c$=Tap distance or height of density column [m]
$\rho_{gas}$=gas density (in sensing lines) [kg/m$^3$]

The addition of $\rho_{gas}$ in Equation (3) compensates for the density of the gas in the sensing lines when determining the density of the LNG.

The microprocessor combines the density calculated using Equation (3) above with the data from metering element 40, and calculates the mass flow rate and volumetric flow rate using Equation (1) and Equation (2) above. As a result, the metered amount of LNG delivered to the use device may be displayed via a display 82. The middle pressure tap 50 can be swapped for the low pressure tap 48 to increase the resolution of the density reading.

Returning to the dispensing operation, a few seconds after the dispensing valve 38 is opened, microprocessor 60 closes recirculation valve 30. This delay helps "soften" the dispensing and metering start by preventing extreme pressure swings within the cryogenic metering chamber. This is desirable because pressure swings can cause a pressure pulse that the high and low pressure taps (or high and middle pressure taps) see at slightly different times, and thus could corrupt the pressure differential data transmitted by stabilizing column differential pressure transmitter 54 to microprocessor 60.

Furthermore, as illustrated in FIG. 2, the spray openings 24 are positioned near the top of the cryogenic metering chamber, while the inlet to the meter run 32 is positioned near the bottom of the cryogenic metering chamber. This minimizes stratification in the cryogenic metering chamber, which could otherwise effect the accuracy of the density determination by the pressure taps.

When dispensing is completed, the user may press a "Stop" button or the like so that the microprocessor 60 closes dispensing valve 38 and opens recirculation valve 30. The user then disconnects the filling hose from the use device and LNG therein travels back to the cryogenic metering chamber through check valve 84 (FIG. 2).

Pump 18 keeps running after the "Stop" button is pressed, and LNG circulates between the metering chamber and the storage tank, and LNG will continue to enter the cryogenic metering chamber via the spray holes 24 and exit via recirculation inlet 28. After a period of time that is sufficient to ensure that the metering chamber is filled with LNG, the pump automatically stops running. As a result, the flow of LNG into the cryogenic metering chamber stops, and the metering element 40 remains submerged in LNG.

If the quantity of LNG to be metered is large, the meter run 32 may be placed external to the cryogenic metering chamber 14. More specifically, small transfers need to be metered extremely accurate from the start of flow. Warm meters will have errors in the order of 5 lbs. (100 lbs. transfer would be a 5% error). With transfers that deliver large quantities, this error is not significant.

As illustrated in FIG. 2, a temperature probe 90 may optionally be positioned within the cryogenic metering chamber and placed in communication with microprocessor 60. In addition, the microprocessor may be programmed with a lookup table listing densities of methane through the range of temperatures typically detected by temperature probe 90 when the system is in operation. The lookup table may also, or alternatively, list densities for other elements typically present in LNG through the range of temperatures typically detected by the temperature probe. As a result, the microprocessor may calculate the percent (%) methane or percent (%) heavies of the LNG within the cryogenic metering chamber using the temperature from the temperature probe 90 and the density from the stabilizing column differential pressure transmitter 54.

In view of the above, the invention provides a system and method for metering cryogenic liquids that includes a dynamic densitometer that measures the density of flowing liquid. The design is extremely robust, with no moving parts, and the meter can be calibrated to meter any liquid ranging in density including, for example, from LNG to nitrogen.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for dispensing a cryogenic liquid comprising;
  a. a storage tank containing a supply of the cryogenic liquid;
  b. a metering chamber;
  c. a liquid inlet line in communication with the storage tank and the metering chamber so that the metering chamber receives cryogenic liquid from the storage tank;
  d. a meter run in communication with the metering chamber, said meter run including a metering element, a dispensing line and a dispensing valve;
  e. a stabilizing column positioned within the metering chamber and including a sidewall defining an interior of the stabilizing column, said sidewall including a plurality of vertically spaced openings;
  f. a first pressure sensor including a first pressure tap positioned within the sidewall or the interior of the stabilizing column so as to be configured to detect a first pressure within the interior of the stabilizing column;
  g. a second pressure sensor including a second pressure tap positioned within the sidewall or the interior of the stabilizing column and vertically spaced from the first pressure sensor so as to be configured to detect a second pressure within the interior of the stabilizing column; and
  h. a controller in communication with the metering element, the first and second pressure sensors and the dispensing valve and programmed to:
    i) calculate a density of the cryogenic liquid in the metering chamber using the first pressure within the interior of the stabilizing column and the second pressure within the interior of the stabilizing column; and
    ii) calculate a metered amount of cryogenic liquid using the calculated density of the cryogenic liquid and data from the metering element.

2. The system of claim 1 wherein the metering element is positioned within the metering chamber and submerged within cryogenic liquid.

3. The system of claim 1 wherein the metering element includes a meter line having an orifice with an inlet pressure sensor in communication with an inlet side of the orifice and an outlet pressure sensor in communication with an outlet side of the orifice, said inlet and outlet pressure sensors in communication with the controller.

4. The system of claim 1 wherein the metering chamber is insulated.

5. The system of claim 1 further comprising a third pressure sensor including a third pressure tap positioned within the sidewall or the interior of the stabilizing column, said third pressure sensor vertically spaced from both the first and second pressure sensors so as to be configured to detect a third pressure within the interior of the stabilizing column and in communication with the controller.

6. The system of claim 1 wherein the first and second pressure taps include openings positioned within the interior of the stabilizing column approximately at a longitudinal axis of the stabilizing column.

7. The system of claim 1 wherein the stabilizing column features an open top end and an open bottom end.

8. The system of claim 1 further comprising a recirculation line extending between a head space of the metering chamber and said storage tank.

9. The system of claim 1 further comprising a fill line in communication with the liquid inlet line, said fill line including a plurality of spray orifices positioned within a head space of the metering chamber so that cryogenic liquid passing through the spray orifices collapses vapor in the head space of the metering chamber.

10. The system of claim 9 wherein the meter run includes an inlet positioned within a bottom portion of the metering chamber.

11. The system of claim 1 wherein the liquid inlet line includes a pump.

12. The system of claim 1 wherein the stabilizing column is positioned about ⅛ inches from an interior surface of a wall of the metering chamber, with the plurality of orifices facing the interior surface of the wall of the metering chamber.

13. The system of claim 12 wherein the stabilizing column features a diameter of about one inch and said plurality of vertically spaced openings are positioned approximately two inches apart.

14. The system of claim 1 further comprising a temperature probe in thermal communication with cryogenic liquid within the metering chamber and in communication with the controller, said controller programmed with a look-up table of elements and to determine a percentage of a component of the cryogenic liquid based upon a temperature detected by the temperature probe and the calculated density.

15. The system of claim 1 wherein the cryogenic liquid is liquid natural gas.

16. The system of claim 1 wherein the first pressure sensor includes a first sensing line running from the first pressure tap to a differential pressure transmitter and the second pressure sensor includes a second sensing line running from the second pressure tap to a the differential pressure transmitter.

17. The system of claim 16 wherein the first and second sensing lines include approximately equal inner diameters and lengths.

18. A metering chamber for dispensing a cryogenic liquid comprising:
   a. a liquid inlet line adapted to communicate with a source of cryogenic liquid so that the metering chamber may receive cryogenic liquid from the source;
   b. a meter run including a metering element, a dispensing line and a dispensing valve;
   c. a stabilizing column positioned within the metering chamber and including a sidewall defining an interior of the stabilizing column, said sidewall including a plurality of vertically spaced openings;
   d. a first pressure sensor including a first pressure tap positioned within the sidewall or the interior of the stabilizing column so as to be configured to detect a first pressure within the interior of the stabilizing column;
   e. a second pressure sensor including a second pressure tap positioned within the sidewall or the interior of the stabilizing column and vertically spaced from the first pressure sensor so as to be configured to detect a second pressure within the interior of the stabilizing column; and
   f. a controller in communication with the metering element, the first and second pressure sensors and the dispensing valve and programmed to:
      i) calculate a density of the cryogenic liquid in the metering chamber using the first pressure within the interior of the stabilizing column and the second pressure within the interior of the stabilizing column; and
      ii) calculate a metered amount of cryogenic liquid using the calculated density of the cryogenic liquid and data from the metering element.

19. The metering chamber of claim 18 wherein the metering element is positioned within the metering chamber and adapted to be submerged within cryogenic liquid.

20. The metering chamber of claim 18 wherein the metering element includes a meter line having an orifice with an inlet pressure sensor in communication with an inlet side of the orifice and an outlet pressure sensor in communication with an outlet side of the orifice, said inlet and outlet pressure sensors in communication with the controller.

21. The metering chamber of claim 18 wherein the metering chamber is insulated.

22. The metering of claim 18 further comprising a third pressure sensor including a third pressure tap positioned within the sidewall or the interior of the stabilizing column, said third pressure sensor vertically spaced from both the first and second pressure sensors so as to be configured to detect a third pressure within the interior of the stabilizing column and in communication with the controller.

23. The metering chamber of claim 18 wherein the stabilizing column features an open top end and an open bottom end.

24. The metering chamber of claim 18 wherein the first and second pressure taps include openings positioned within the interior of the stabilizing column approximately at a longitudinal axis of the stabilizing column.

25. The metering chamber of claim 18 further comprising a fill line in communication with the liquid inlet line, said fill line including a plurality of spray orifices positioned within a head space of the metering chamber so that cryogenic liquid passing through the spray orifices collapses vapor in the head space of the metering chamber.

26. The metering chamber of claim 25 wherein the meter run includes an inlet positioned within a bottom portion of the metering chamber.

27. The metering chamber of claim 18 wherein the stabilizing column is positioned about ⅛ inches from an interior surface of a wall of the metering chamber, with the plurality of orifices facing the interior surface of the wall of the metering chamber.

28. A system for dispensing a cryogenic liquid comprising:
   a. a storage tank containing a supply of the cryogenic liquid;
   b. a metering chamber;
   c. a liquid inlet line in communication with the storage tank and the metering chamber so that the metering chamber receives cryogenic liquid from the storage tank;
   d. a meter run in communication with the metering chamber, said meter run including a metering element, a dispensing line and a dispensing valve;
   e. a stabilizing column positioned within the metering chamber and including a sidewall defining an interior of the stabilizing column, said sidewall including a plurality of vertically spaced openings;
   f. a first pressure sensor configured to detect a first pressure within an upper portion of the interior of the stabilizing column;
   g. a second pressure sensor configured to detect a second pressure within a lower portion of the interior of the stabilizing column; and
   h. a controller in communication with the metering element, the first and second pressure sensors and the dispensing valve and programmed to:
      i) calculate a density of the cryogenic liquid in the metering chamber using the first pressure within the upper portion of the interior of the stabilizing column and the second pressure within the lower portion of the interior of the stabilizing column; and
      ii) calculate a metered amount of cryogenic liquid using the calculated density of the cryogenic liquid and data from the metering element.

* * * * *